United States Patent [19]
Kytömäki et al.

[11] Patent Number: 5,329,771
[45] Date of Patent: Jul. 19, 1994

[54] METHOD FOR SECURING THE LUBRICATION OF BEARINGS IN A HERMETIC HIGH-SPEED MACHINE

[75] Inventors: Timo Kytömäki, Lappeenranta; Olli Lindgren, Helsinki; Jarmo Alamäki, Lappeenranta; Jaakko Larjola, Mäntyharju, all of Finland

[73] Assignee: Oy High Speed Tech Ltd., Tampere, Finland

[21] Appl. No.: 859,381

[22] PCT Filed: Sep. 25, 1991

[86] PCT No.: PCT/FI91/00295

§ 371 Date: Jul. 24, 1992

§ 102(e) Date: Jul. 24, 1992

[87] PCT Pub. No.: WO92/05342

PCT Pub. Date: Apr. 2, 1992

[30] Foreign Application Priority Data

Sep. 26, 1990 [FI] Finland .................. 904720

[51] Int. Cl.⁵ .................. F01B 31/00; F01K 19/00
[52] U.S. Cl. .................. 60/657; 60/667; 184/6.22
[58] Field of Search .................. 60/657, 646, 667; 184/6.22

[56] References Cited

U.S. PATENT DOCUMENTS

| | | | |
|---|---|---|---|
| 3,062,553 | 11/1962 | Juzi | 60/646 |
| 3,935,710 | 2/1976 | Dickinson . | |
| 4,002,224 | 1/1977 | Easter | 184/6.22 X |
| 4,044,561 | 8/1977 | Hohn . | |
| 4,363,216 | 12/1982 | Bronicki | 60/657 |
| 4,471,621 | 9/1984 | Amir et al. | 60/657 |
| 4,517,804 | 5/1985 | Ura et al. | 60/657 |
| 4,526,523 | 7/1985 | Parker | 184/6.22 X |
| 4,558,228 | 12/1985 | Larjola | 60/657 X |
| 4,564,084 | 1/1986 | Heckel | 184/6.22 X |
| 4,593,527 | 6/1986 | Nakamoto et al. | 60/667 X |
| 5,217,085 | 6/1993 | Barrie et al. | 184/6.22 X |

Primary Examiner—Edward K. Look
Assistant Examiner—Hoang Nguyen
Attorney, Agent, or Firm—Pollock, Vande Sande & Priddy

[57] ABSTRACT

The present invention is directed to a method for operating a hermetic, small-size power plant in which a primary circulation is conducted in a main line connecting a high-speed machine including at least a turbine and a generator installed on a joint rotor, a vaporizer and a condenser. Fluid lubrication of bearings of the rotor during the continuing operation is effected by fluid medium passing through the condenser and along the main line of the primary circulation. The vaporizer is connected to the high-speed machine through medium flow paths defining a circulating medium circuit bypassing the condenser and at least partly bypassing the main line of the primary circulation to secure passage of circulating medium accumulated in the vaporizer for lubrication of the bearings of the rotor during stopping of the primary circulation.

13 Claims, 2 Drawing Sheets

METHOD FOR SECURING THE LUBRICATION OF BEARINGS IN A HERMETIC HIGH-SPEED MACHINE

FIELD OF THE INVENTION

The present invention relates to a method in a hermetic small-size power plant, especially in one based on the Organic Rankine Cycle (ORC) process, comprising a system consisting of a high-speed machine, vaporizer, and condenser which are connected by a main line for effecting the primary circulation, wherein the high-speed machine comprises a turbine, a generator and possibly a main feed pump mounted on a joint rotor, and in which the bearing of the rotor is arranged to be lubricated by fluid lubrication and particularly in a situation of continuing operation of the process through the condenser along the main line of primary circulation.

BACKGROUND OF THE INVENTION

The small-size power plant based on the ORC process was developed especially for the recovery of waste heat from various heat-producing processes or machines where, due to the temperature of the waste heat or due to the circumstances of the environment, waste heat cannot be used as such or by means of heat exchangers or corresponding means. In a small-size power plant, waste heat is converted generally by a turbine to electricity which is easily used for different purposes.

It can be shown thermodynamically that the Organic Rankine Cycle process is the best applicable method for this kind of energy converting. The heat of vaporization of an organic substance is low in relation to for example, the heat of evaporation of water, and its fall of specific enthalpy in the turbine is small and the mass flow rate in relation to the output is high, and it is possible to reach a high turbine efficiency even in a range of small capacity.

A hermetic or fully closed-circuit process has the advantage that there are no leaks and the process is thus reliable and durable in operation.

The utilization of high-speed technology, wherein the turbine is directly coupled with a generator rotating at the same speed and thus producing high-frequency current, has made it possible to further simplify the process such that e.g. a separate reduction gear required by conventional processes as well as shaft inlets are not needed.

A hermetic energy converter of this kind, operating on high-speed technology and based on the ORC process, is known from the publication FI-66234, according to which the bearing of the rotor of the high-speed machine is lubricated by an organic circulating medium, wherein the circulating medium is in a gaseous state. Thus it is possible to reach a very high efficiency, because the losses of gaseous bearing are very small. However, for reasons of manufacturing techniques, bearings lubricated with fluid circulating medium have been shown to be more cost-saving.

The use of the circulating medium in a liquid state in the said bearing system is known for example from U.S. Pat. No. 2,961,550 which relates to the bearings of a power plant lubricated by a circulating medium, with special respect to starting up a power plant. According to the publication, the said bearing system is effected by condensating the circulating medium from a gaseous state into a liquid state by a separate condenser, whereafter the fluid circulating medium is directed to the bearings. With particular attention to starting up the power plant, its bearing pipework is equipped with a valve that operates on the basis of the pressure of the circulating medium and opens at an essentially lower pressure than the main valve in the pipework of the primary circulation, wherein the lubrication of bearings starts before the start of the turbine.

In the small-size power plant or energy converter systems in use, a problem has arisen in connection with different stoppage situations due to disturbances, failures and corresponding reasons when the primary circulation to the turbine must be discontinued and the lubrication of the bearings of the rotor in the high-speed machine in the present systems is discontinued or significantly reduced during a stopping situation. Thus the technique used, by which the rotor generally rotates at the synchronous speed of the network (3000 rpm), results in insufficient lubrication which wears down the bearings and essentially reduces their time of use.

The method according to this invention makes it possible to obtain a decisive improvement to the disadvantages presented above and thus to raise the level of technology in the field. To reach this objective, it is characteristic to the method according to this invention that in a stoppage situation of the primary circulation in the main line of the process, the fluid lubrication of the bearings of the rotor is arranged from the vaporizer of the energy converter, such as from a boiler, a process furnace, a ceramic furnace or corresponding, by means of pressurized circulating medium accumulated in the vaporizer.

One of the most important advantages of the method according to the invention is the essentially longer uninterrupted duty cycles of the high-speed machine, and thus also of the entire energy converter, as well as the essentially longer time of use of the bearings of the said rotor. Also, the controllability of the entire process of the energy converter in a stoppage situation is essentially improved.

The following explanation demonstrates the invention in detail and also refers to the attached drawings wherein

BRIEF DESCRIPTION OF THE DRAWING(S)

FIG. 1 shows an operating diagram of a first embodiment of the method according to the present invention in a typical ORC process in principle, and FIG. 2 shows an alternative operating diagram of a second embodiment of the method according to the invention in a typical ORC process in principle.

DETAILED DESCRIPTION OF THE PREFERRED EMBODIMENT

Figure 1:
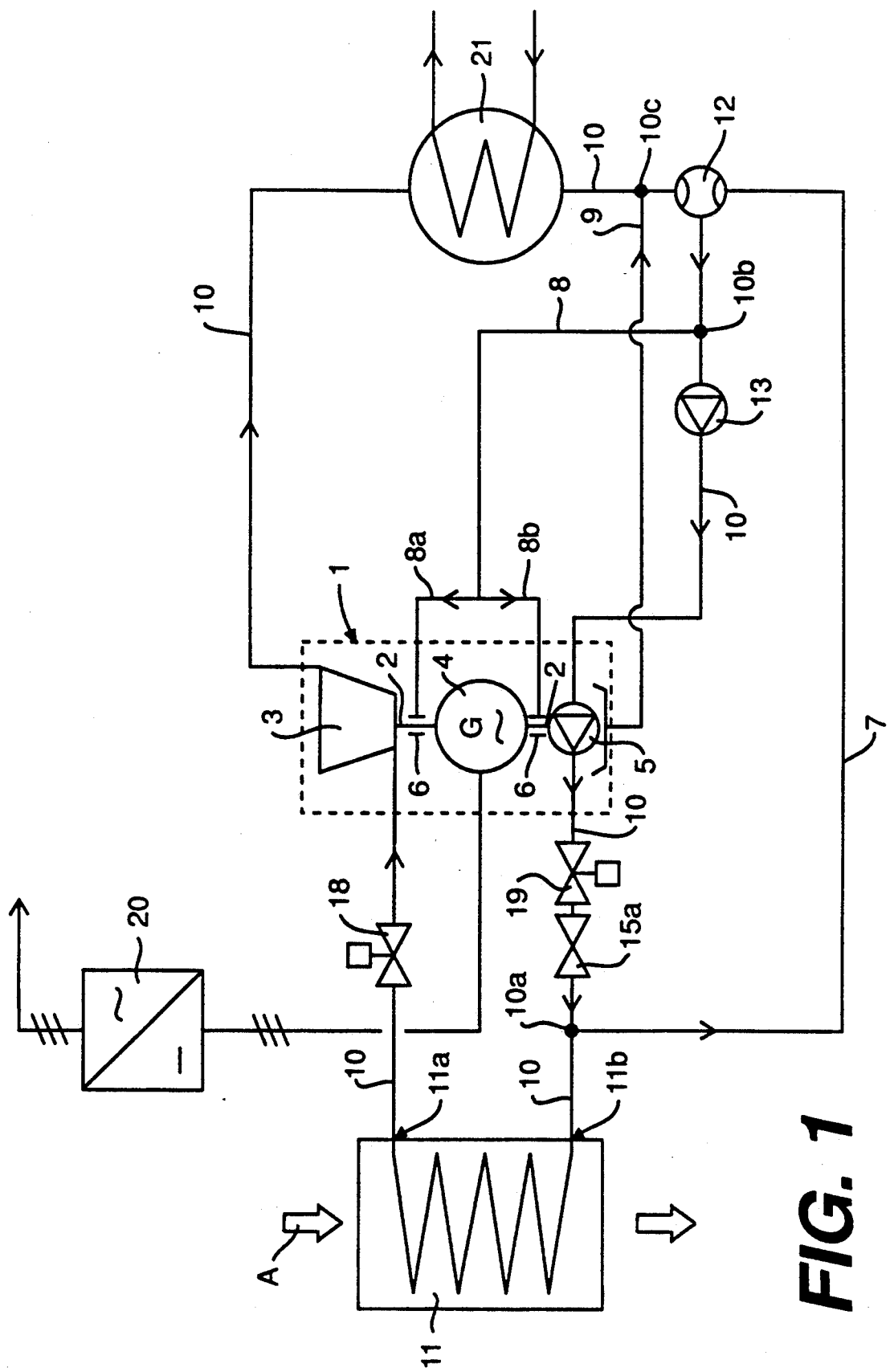
Figure 2:
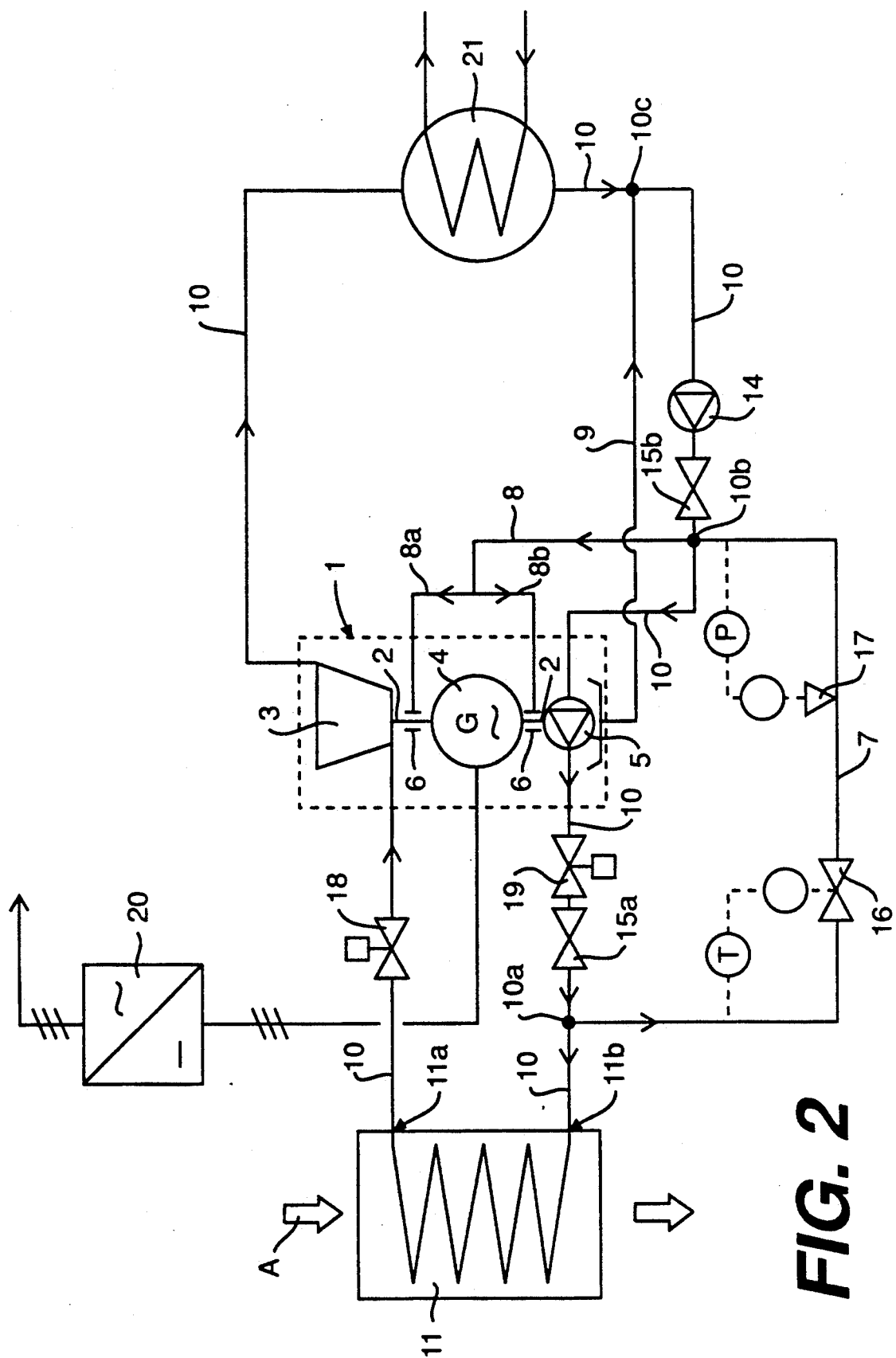

The method according to the present invention is intended for application in processes similar to those presented in FIGS. 1 and 2, wherein the primary circulation 10 of the small-size power plant or the energy converter is effected in such a way that evaporator 11, such as a boiler, process furnace, ceramic furnace or the like evaporates the organic circulating medium, such as different Freons or toluene, which further expands in turbine 3, is condensated in condenser 21, and is returned by pump/pumps 5, 12, 13, 14 to evaporator 11 wherein the flow of circulating medium during the normal drive of the process to the turbine is controlled by adjusting the main operating valve 18 and/or the operating valve 19. The heat energy produced by the evaporator 11 in the circulating medium is converted in the high-speed machine 1 by generator 4 which rotates at the same speed as turbine 3 into high-frequency electricity which is further rectified/inverted in the further processing 20 to-be-applicable for later uses. In the normal drive, the hydrodynamic bearings 6 are lubricated by the fluid circulating medium along the pipeline 8 from the pressure side of pump 12 or 14.

Because the organic medium, contrary to steam, is usually superheated when expanded, the efficiency of the process can be further improved with respect to the applications presented by installing a separate preheater or recuperator between turbine 3 and vaporizer 11. The number of pumps needed in the process depends on the pressure level of the circulating medium, which is affected by the features of the circulating medium used, the temperature of the heating gas flow A, the height differences of the pipework in the process and other corresponding factors, in which case, with low pressure level, the feed pump 5 connected to rotor 2 of the turbine 3 and generator 4 is not necessarily needed in the high-speed machine 1.

In practice, a permanently magnetized generator, presented in a greater detail in the publication FI-71640, has been used as generator 4. Furthermore, it is practical to use as bearings 6 hydrodynamic rolling-segment type bearings, whose structure and operating principle is presented in more detail for example in the publication Glacier: Tilting Pod Journal Bearings, Designers Handbook No. 10.

In a typical ORC process according to FIG. 1, the method according to the present invention is realized in such a way that in a stoppage situation of the primary circulation of the main line 10, wherein the main operational valve 18 in the main line 10 is closed, the temperature development in vaporizer 11 continues, and the circulating medium accumulated in the vaporator is vaporized. Because of evaporation, the pressure level of the circulating medium rises in vaporizer 11. The rise in the pressure level results in the discharge of the circulating medium in a liquid state at the inlet side 11b of the vaporizer and its further passage controlled by the barrier member (valve) 15a in the main line 10 from the branch point 10a of the main line to the flow path 7 which discharges into fluid ejector 12. By the action of fluid ejector 12, the circulating medium passes further, when the pre-feed pump 13 is stopped and the operating valve 19 closed, from the branch point 10b of the main line via the second flow path 8 to the bearings 6 of rotor 2, and after lubrication at the third flow path 9 back to the suction side of the fluid ejector 12 of main line 10. The flow paths 7 and 8 operate as flow paths conveying circulating medium to the high-speed machine with the purpose of lubrication, and the third flow path 9 operates as a flow path for returning circulating medium acting as a lubricant from the high-speed machine.

In accordance with the general principles of measurement in the circulation process, the inner volume of vaporizer 11 containing circulating medium is related to the inner volumes of the flow paths 7, 8, 9 and the bearings 6 in such a way that after closing of the main operating valve 18, a possible stoppage of operation of vaporizer 11 which is due to an increase in pressure and/or temperature of the circulating medium accumulated in vaporizer 11, and which is effected by an inner safety device in vaporizer 11, such as a guard for boiling dry or corresponding, occurs essentially later than closing of the main operational valve 18. The lubrication of bearings 6 is secured for the time required for stopping rotor 2, in practice for at least 30 seconds after the closing of the main operational valve 18. In the most common systems, the volume of vaporizer 11 is manifold as compared with the stopping stage which normally takes about 30 seconds. Thus the circuit provides for the fluid lubrication of bearings during the stopping of the rotor in all failure situations.

In a typical ORC process according to FIG. 2, the method according to the invention is realized in an altenative way that in a stoppage situation of the primary circulation of the main line 10 (for example when pre-feed pump 14 stops), wherein the main operational valve 18 in the main line 10 is closed, the temperature development in vaporizer 11 continues, wherein the circulating medium accumulated in the vaporizer is vaporized. Because of evaporation, the pressure level of the circulating medium rises in such vaporizer 11 in a way that the pressure level is highest at the outlet side 11a and lowest at the inlet side 11b. The rise in pressure level results in the discharge of the circulating medium in a liquid state from the inlet side 11b of the vaporizer and its passage by the barrier member 15a in the main line 10 from the branch point 10a of the main line via the first flow path 7 to the branch point 10b on the pressure side of the pre-feed valve 14 in the main line 10, wherein the pressure level of the circulating medium is adjusted by means 17 in the flow path 7, such as a pressure reducing valve or corresponding. From the branch point 10b of the main line, the circulating medium is further conveyed by pressure and directed by barrier member 15b between the branch point 10b and pre-feed pump 14 through the second flow path 8 to the bearings 6 of rotor 2, and after lubrication by the third flow path 9 back to the suction side of pre-feed pump 14 of main line 10. Because of the general principles of the construction of the circulating process, the inner volume of vaporizer 11 containing circulating medium is related to the inner volumes of flow paths (circuits) 7, 8, 9 and bearings 6 such that after the main operational valve 18 is closed, a possible operational stoppage of either vaporizer 11, due to the increase of pressure and/or temperature of the circulating medium accumulated in vaporizer 11 by an inner safety device in vaporizer 11, such as a guard for boiling dry, or a stoppage of the flow through the first flow path 7 by means 16 in the first flow path 7, such as a temperature-controlled valve or corresponding, takes place essentially later than the closing of the main operational valve 18, and the fluid lubrication of the bearings 6 is secured for the time of stopping of rotor 2, in practice at least 30 seconds after the closing of the main operational valve 18. Thus the circuit provides for the fluid lubrication of bearings during the stopping of the rotor in all failure situations.

It is obvious that the present invention is not limited to the applications presented above, but it can be modified within the basic idea even to a great extent. For instance, the circulating medium accumulated in the vaporizer can be used in a vaporized state, wherein the vapor, for example according to U.S. Pat. No. 2,961,550 mentioned above, is condensated by condenser 21 or by a separate condenser into the liquid state, whereafter the fluid circulating medium is conveyed to the bearings according to the present invention. It should also be noted that the drawings presented are primarily operational embodiments in principle, wherein the pipework equipment-may in practical applications vary or be more complete as to the valves, pumps, and the line.

I claim:

1. A method for operating a hermetic, small-size power plant, including the steps of:
   a) conducting a primary circulation in a main line connecting a high-speed machine including at least a turbine and a generator installed on a joint rotor, a vaporizer and a condenser;
   b) effecting fluid lubrication of bearings of the rotor during the continuing operation by fluid medium passing through the condenser and along the main line of the primary circulation;
   c) connecting the vaporizer to the high-speed machine through medium flow paths defining a circulating medium circuit and bypassing the condenser and at least partly bypassing the main line of the primary circulation to secure passage of circulating medium accumulated in the vaporizer for lubrication of the bearings of the rotor during stopping of the primary circulation.

2. Method according to claim 1, further comprising:
   providing a branch point between the high-speed machine and the inlet side of the vaporizer in the main line;
   arranging a barrier member in connection with the branch point of the main line, to prevent the flow of circulating medium in the direction of the high-speed machine in the main line;
   connecting to the branch point the inlet side of the fluid flow path circuit for passing circulating medium to the high-speed machine;
   connecting the outlet side of the circulating medium flow circuit to the bearings; and
   returning to circulating medium from the high-speed machine to the main line through the circulating medium fluid flow circuit.

3. Method according to claim 1, further comprising the steps of:
   arranging a branch point between the high-speed machine and the inlet side of the vaporizer in the main line;
   providing a barrier member connected to the branch point of the main line, the barrier direction of which is such that it prevents the flow of circulating medium in the direction of the high-speed machine in the main line;
   connecting the inlet side of a first flow path of the circuit to the branch point and the outlet side of said first flow path to means for conveying circulating medium to the high-speed machine; and
   conveying the circulating medium by said means for conveying circulating medium to the bearings of the high-speed machine using a second flow path of the circuit.

4. Method according to claim 1, wherein the pressurized circulating medium accumulated in the vaporizer in a liquid state is passed by a first fluid flow path of the circuit to a fluid ejector operating as a device for conveying circulating medium in such a way that it pumps the lubricating fluid for the bearings lubrication by using a second fluid flow path.

5. Method according to claim 4, wherein the inlet side of the second fluid flow path of the circulating medium circuit is arranged between a pre-feed pump located after the fluid ejector in the direction of flow of the circulating medium in the main line, and wherein the operation of the pre-feed pump is controlled and discontinued and the flow of the circulating medium to the pre-feed pump is prevented by a reflux valve.

6. Method according to claim 1, wherein pressurized circulating medium accumulated in the vaporizer in a liquid state is passed by a first fluid flow path of the circuit to the pressure side of a pre-feed pump operating as a device for conveying circulating medium to the main line.

7. Method according to claim 6, wherein at least one member is arranged between the main line and a branch point of the second fluid flow path, and in between the main line and a branch point of the outlet side of a third fluid flow path of the circuit in the main line operating against the normal flow direction of the circulating medium.

8. Method according to claim 3, wherein at least one member for controlling the pressure of the circulating medium, is arranged in the first fluid flow path.

9. Method according to claim 3, wherein at least one element for limiting the temperature of the circulating medium, is arranged in the first fluid flow path.

10. Method according to claim 1, wherein the inner volume of the vaporizer containing circulating medium is so arranged in relation to the inner volumes of said fluid flow paths and the bearings that after closing of a main operational valve, the stoppage of the operation of the vaporizer, due to the rise of at least one of pressure and temperature of the circulating medium accumulated in the vaporizer, and the stoppage of fluid flow through the medium flow paths takes place essentially later than the closing of the main operational valve, to thereby secure lubrication of the bearings during the stoppage of the rotor.

11. Method according to claim 7, wherein said at least one member is a one-way valve.

12. Method according to claim 8, wherein said pressure controlling member is a pressure-reducing valve.

13. Method according to claim 9, wherein said temperature limiting element is a temperature-controlled valve.

* * * * *